(12) United States Patent
Yako

(10) Patent No.: US 6,523,880 B1
(45) Date of Patent: Feb. 25, 2003

(54) CAR WINDOW AND SUNSCREEN ASSEMBLY

(76) Inventor: Maher C. Yako, 1434 East Maxlow, Hazel Park, MI (US) 48030

( * ) Notice: Subject to any disclaimer, the term of this patent is extended or adjusted under 35 U.S.C. 154(b) by 0 days.

(21) Appl. No.: 09/892,975

(22) Filed: Jun. 27, 2001

(51) Int. Cl.[7] .................................................. B60J 3/00
(52) U.S. Cl. ...................... 296/97.1; 296/152; 296/97.8
(58) Field of Search ................................ 296/97.1, 152, 296/97.9, 97.11; 49/50, 56, 61, 62

(56) References Cited

U.S. PATENT DOCUMENTS

| | | | | |
|---|---|---|---|---|
| 3,749,147 A | * | 7/1973 | Hess et al. ................... | 296/152 |
| 4,179,155 A | | 12/1979 | Ortiz | |
| 4,707,018 A | | 11/1987 | Gavagan | |
| 4,746,162 A | | 5/1988 | Manness | |
| 4,773,697 A | * | 9/1988 | Svensson ..................... | 296/152 |
| 4,932,711 A | * | 6/1990 | Goebel ....................... | 296/97.7 |
| 5,022,701 A | * | 6/1991 | Thompson, II ............ | 296/97.1 |
| 5,165,188 A | * | 11/1992 | Tsiros ........................ | 296/97.7 |
| 5,362,119 A | * | 11/1994 | Rosentratter ............... | 296/97.9 |
| 5,379,822 A | * | 1/1995 | Lenetz ................... | 160/370.21 |
| 5,524,694 A | * | 6/1996 | Arapis ........................ | 296/152 |
| 5,562,144 A | * | 10/1996 | Ming-Shun ................ | 296/97.8 |
| 5,570,734 A | | 11/1996 | Wu | |
| 5,588,476 A | * | 12/1996 | Trethewey ........... | 160/DIG. 13 |
| 5,605,370 A | * | 2/1997 | Ruiz .......................... | 296/97.8 |
| 6,347,825 B2 | * | 2/2002 | Seel et al. .................. | 296/97.8 |
| 6,367,536 B1 | * | 4/2002 | St Louis ..................... | 296/152 |

FOREIGN PATENT DOCUMENTS

| | | | |
|---|---|---|---|
| DE | 3222861 A1 | * | 12/1983 |
| DE | 3414250 A1 | * | 10/1985 |
| DE | 3415930 A1 | * | 10/1985 |
| DE | 3836420 A1 | * | 5/1989 |
| DE | 4241138 A1 | * | 6/1994 |
| EP | 0 265 891 A2 | * | 10/1987 |
| JP | 58 76321 | * | 5/1983 |

* cited by examiner

Primary Examiner—Kiran Patel
(74) Attorney, Agent, or Firm—Young & Basile

(57) ABSTRACT

A side car window and sunscreen assembly for selectively moving the sunscreen with the movement of the window includes a window located within a window track of a side door and selectively movable between an open and closed position, a sheet material or sunscreen positionable within the window track adjacent to the side car window wherein the sheet material has one edge selectively attachable to the car window. Selective attachment between the sunscreen and window may be accomplished through a magnetic strip attached to one of the window and sunscreen and may further include a portion of the sunscreen pivotable about a hinge.

26 Claims, 3 Drawing Sheets

CAR WINDOW AND SUNSCREEN ASSEMBLY

FIELD OF THE INVENTION

This invention relates to vehicle windows and especially for a sunscreen for a car window.

BACKGROUND OF THE INVENTION

During certain daytime driving conditions, the driver and his passengers may be annoyed by the beating of the sun rays through the side windows of the vehicle. Currently there are many devices available for the aftermarket that can be attached to the side of a window or the window frame which reduces the heat and glare from the sun upon the interior of the vehicle. All of these aftermarket devices require a manual installation or removal of the device against the window. As a result if during the middle of a ride the sun begins to glare into the side window where a child is seated, the driver must pull over to the side to manually install the sunscreen to protect the child from the sun glare.

SUMMARY OF THE INVENTION

It is the intent of the present invention to address the aforementioned concerns by providing a side car window and sunscreen assembly for selectively raising and lowering the sunscreen with the movement of the window within the window track. The car window and sunscreen assembly of the present invention is aesthetically pleasing without any cumbersome installation by the driver. The assembly comprises a window located in a window track of a side door of a vehicle and that is selectively moveable between open and closed positions. A semi-flexible sheet material is positioned adjacent to the side car window within the window track. The sheet material may simply move adjacent to but independently of the window or may have one edge that is selectively attachable to the car window.

In one aspect of the invention one edge of the sunscreen has a magnetic strip attached thereon and one edge of the car window has a metallic strip thereon, wherein the magnetic strip is selectively movable toward the metallic strip for connection thereto.

In another aspect of the sheet material has a lip along its upper edge for manually raising and lowering the screen with the operator's fingers.

In another aspect of the invention the sheet material has a U-shaped hinged portion along one edge for selectively gripping one edge to the window.

In yet another aspect of the invention the assembly the sheet material is flexible and the assembly further includes a roller wherein the flexible sheet material is retractable onto the roller when not connected to the window.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
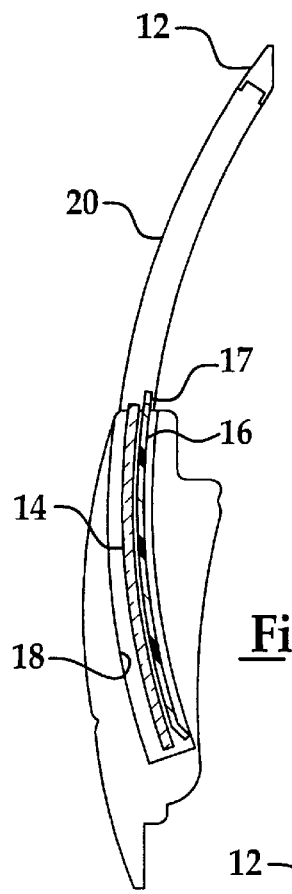
FIG. 1 is an end cross-sectional view of a vehicle car door having a car window and sunscreen assembly according to one embodiment of the present invention.

The present invention as shown in the Figures, provides a car window and sunscreen assembly 10 for a car door 12 or other side window (not shown) on a vehicle. The car window and sunscreen assembly include a window 14 and a sunscreen 16 positionable within the track 18 of a conventional car door 12 or side window frame (not shown). The sunscreen 16 can be a tinted plastic or a screen mesh material that minimizes sun rays from penetrating past the sunscreen and provides either transparent, semi-transparent or opaque coverage.

The conventional window 14 includes means for raising and lowering the window. The means for raising and lowering the window may include a button 22 to activate the power window mechanism (not shown) or a handle (not shown) for mechanically raising and lowering the Window 14.

The present invention includes a sunscreen 16 positioned within the same track 18 as the window 14 or in an adjacent track to the window. In the first embodiment, the sunscreen 16 is a semi-flexible material that can be raised independently from the window 14 by manually gripping a lip 17 located along an upper peripheral edge 38 of the sunscreen 16. An operator can raise the sunscreen by manually lifting the lip 17 on the sunscreen 16. The operator can lower the sunscreen by manually applying a download force on the lip 17 of the sunscreen 16. The sunscreen 16 can be raised or lowered regardless of the position of the window 14.

Figure 2A:
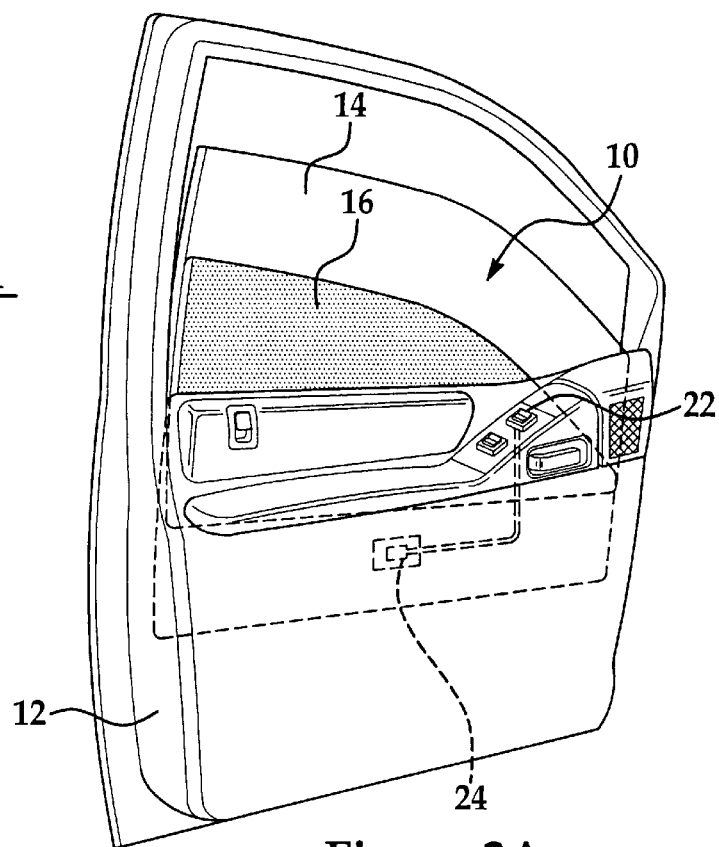
FIG. 2A is a perspective view of the interior of a vehicle car door having a car window and a sunscreen assembly according to another embodiment of the present invention.
Figure 2B:
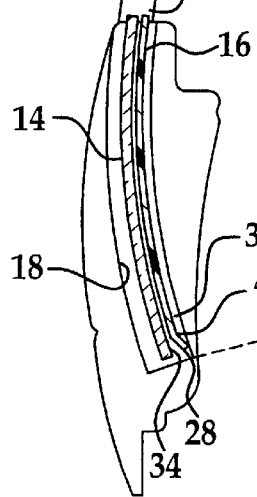
FIG. 2B is an end cross-sectional view of the embodiment of the invention of FIG. 2A.

In a second embodiment, shown in FIGS. 2A and 2B the car window and sunscreen assembly 10 is configured so that the car window 14 can be raised and lowered independently of the sunscreen 16, but the sunscreen 16 is only raised and lowered with the car window 14. An activation sunscreen button 24 coordinates with the window button 22 to raise the window 14 so that the sunscreen 16 is activated to move along with the window 14.

FIG. 2B shows a cross sectional view of the car door 12 showing the window 14 and sunscreen 16 in a lowered position within the track 18 of the door. The sunscreen 16 is positioned adjacent the interior 26 of the door panel 12. The car window and sunscreen assembly 10 includes a means for attaching the sunscreen 16 to the window 14 so that when the window 14 is raised by the power button 22 or handle (not shown) then the sunscreen 16 will also be raised with the movement of the window 14. FIGS. 2A and 2B shows one embodiment for providing the means for raising the sunscreen 16 with the window 14. The sunscreen 16 is provided at its lower end with a magnetic strip 28 extending along the lower peripheral edge 30 of the sunscreen 16. The magnetic strip 28 is hingedly connected to the peripheral edge 30, so that the magnetic strip 28 may pivot within the track 18 about edge 30. The lower peripheral edge 32 of the window 14 is provided with a metallic strip 34 attached to the inner surface of the window 14.

Figure 5A:
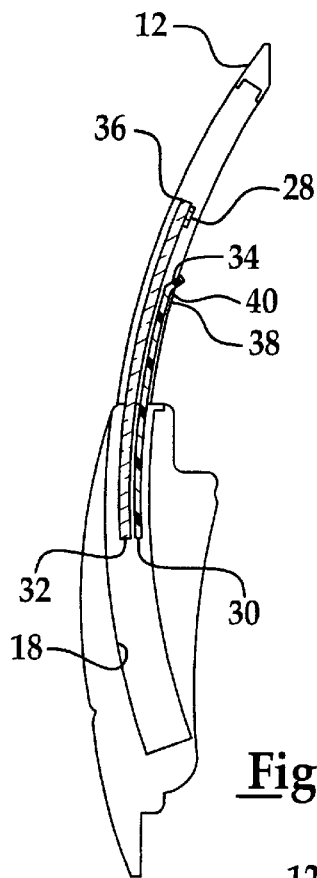
FIG. 5A is an end cross-sectional elevational view of a sixth embodiment of the invention.

FIG. 5A shows an alternative embodiment to FIGS. 2A and 2B. In FIG. 5A, a magnetic strip 28 is located along the upper peripheral edge 36 of the window 14. A metallic strip 34 is hingedly connected to the upper peripheral edge 38 of the sunscreen 16. The metallic strip 34 pivots about the hinge 40 by actuation of the sunscreen button 24 which communicates mechanically or electronically to the hinge 40. Therefore it can be seen by viewing FIGS. 2S, 2B and 5A that the metallic strip 28 can be located on either the upper or lower peripheral edges of either the window 14 or sunscreen 16. When the magnetic strip 28 is located on one of the window 14 or sunscreen 16, the metallic strip 34 is located on the other one of the window 14 or sunscreen 16. In addition, either the magnetic strip 28 or the metallic 34 may be hingedly connected to the sunscreen 16.

The embodiments shown in FIGS. 2A, 2B and 5A work similarly. If the sunscreen switch 24 is activated, the hinge 40 which mechanically or electronically communicates with the switch 24 will pivot so that the magnetic strip 28 or metallic strip 34 will move toward the window 14. The magnetic strip 28 or metallic strip 34 on the sunscreen 16 will only connect with the corresponding strip on the window 14 when both the window 14 and sunscreen 16 are in the same position, either fully lowered or raised. With the strip on the sunscreen 16 connected to the corresponding strip on the window 14, both the sunscreen and window will be raised or lowered by the window handle or power window button 22. If the sunscreen switch 24 is not activated, the window 14 can be raised and lowered independently.

Figure 5B:
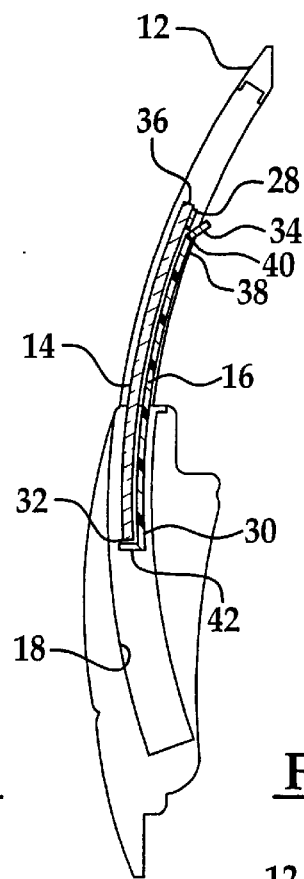
FIG. 5B is an end cross-sectional elevational view of a seventh embodiment of the invention.

FIG. 5B shows an additional aspect of the activation assembly 10 wherein the magnetic strip 28 and metallic strip 34 are located along the upper peripheral edges of the window 14 and sunscreen 16. FIG. 5B shows that the sunscreen 16 also has a horizontal ledge 42 along its lower peripheral edge 30. The horizontal ledge 42 will be positioned under the lower peripheral edge 32 of the window 14. When both the window 14 and sunscreen 16 are in the lower position as shown in FIG. 2B, if the occupant of the vehicle wants both the window 14 and the sunscreen 16 in an up or closed position, the occupant will activate sunscreen switch 24 which will pivot the magnetic strip 28 or the metallic strip 34 toward each other. When the power window button 22 or handle is activated both the window 14 and sunscreen 16 will raise simultaneously since the sunscreen 16 is magnetically attached to the window 14. If the occupant deliberately or inadvertently deactivates sunscreen button 24 while the window and sunscreen are raised, the magnetic strip 28 will be spaced or removed from the metallic strip 34. Although the sunscreen 16 will not fall into the track 18 of the door or panel of the vehicle because of the friction within the frame opening, if the occupant decides to lower the window 14, the embodiment shown in FIG. 5A would not necessarily lower the sunscreen 16 also. Therefore, the horizontal ledge 42 provides a means for lowering both the window 14 and sunscreen 16 simultaneously upon lowering the window 14. The lower peripheral edge 32 of the window will provide a downward force upon the horizontal ledge 42 to thus move the sunscreen 16 also into the lowered position.

Figure 4A:
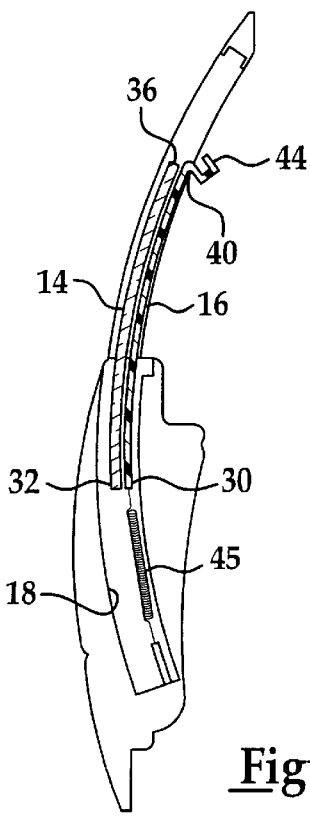
FIG. 4A is an end cross-sectional elevational view of a fourth embodiment of the invention.
Figure 4B:
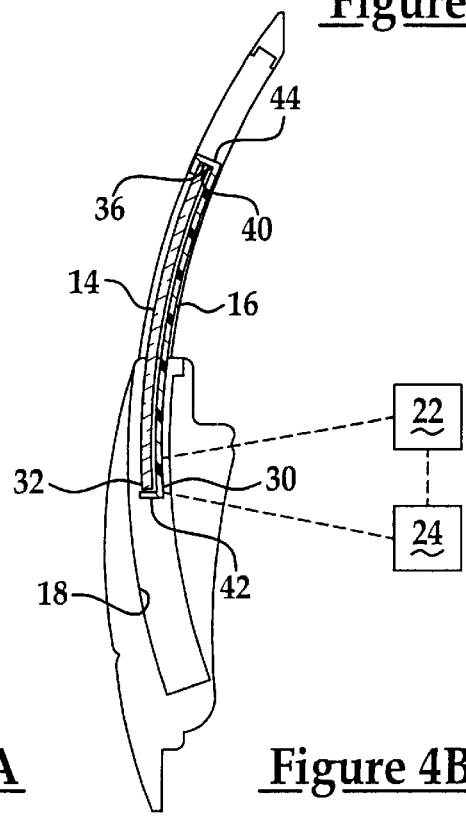
FIG. 4B is an end cross-sectional elevational view of a fifth embodiment of the invention.

FIGS. 4A and 4B show other embodiments. In FIGS. 4A and 4B, the sunscreen 16 is provided with a pivotally hinging U-shaped member 44 along its upper peripheral edge 38. The U-shaped member 44 will pivot about its hinge 40 to surround and grip the upper peripheral edge 36 of the window 14 as shown in FIG. 4B, either mechanically or electronically by the activation of sunscreen button 24. When the sunscreen button 24 is in the off or deactivated position, the U-shaped member 44 will pivot away from the window 14 as shown in FIG. 4A. The U-shaped member 44 preferably is a resilient member that has gripping properties for providing a frictional grip about the upper peripheral edge 36 of the window 14. When the U-shaped member 44 is gripping the window 14, and the occupant powers the window 14 in the up position by power button 22, the window 14 will carry the sunscreen 16 into the upward position also.

Again, the sunscreen 16 and window 14 must be in the same position for this U-shaped member 44 to grip the upper peripheral edge 36 of the window when the sunscreen button 24 is activated. A spring 45 is attached to the lower peripheral edge 30 of the sunscreen 16. The spring 45 biases the sunscreen 16 to the lowered position when the U-shaped member 44 is not gripping the upper peripheral edge 36 of the window 14. FIG. 4B shows the embodiment without the spring 45 but provides the additional feature of the horizontal ledge 42 positioned under the lower peripheral edge 32 of the window. As discussed supra regarding FIG. 5B, if the occupant deliberately or inadvertently deactivates the sunscreen button 24 the U-shaped member 44 will pivot away from its gripping position so that the sunscreen 16 is no longer connected to the window 14. If the occupant deactivates the sunscreen button 24 when the window 14 and sunscreen 16 are in the up and closed position, then if the occupant decides to lower the window the lower peripheral edge 32 of the window 14 will place a downward force on the horizontal ledge 42 to carry the sunscreen 16 to the downward or open position also.

Figure 3A:
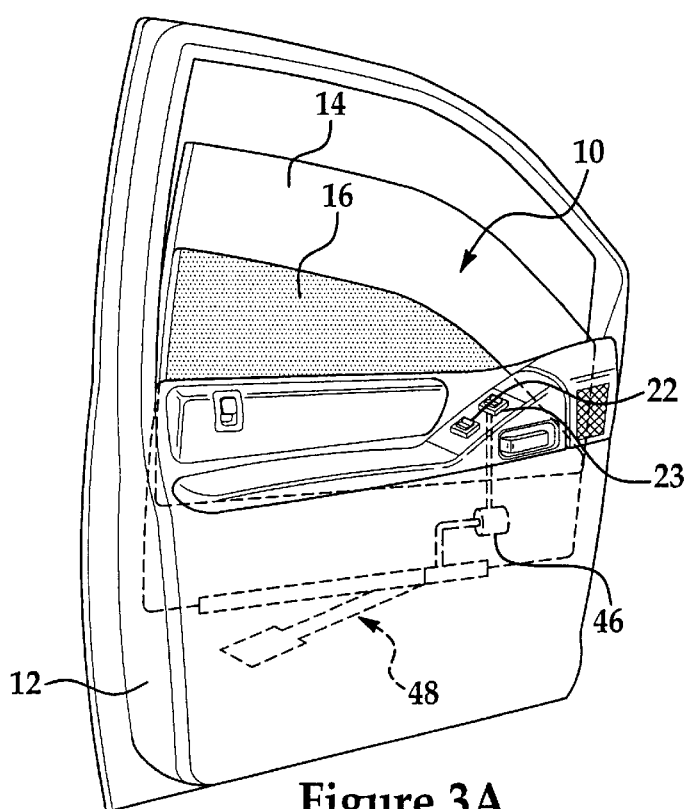
FIG. 3A is a perspective view of a third embodiment of the invention.
Figure 3B:
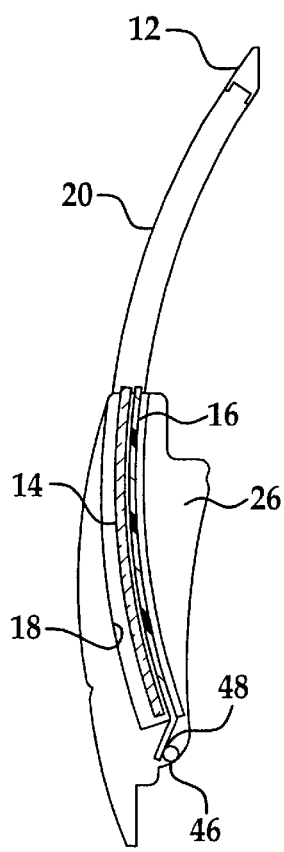
FIG. 3B is an end cross-sectional view of the third embodiment of the invention.

FIGS. 3A and 3B show yet another embodiment for raising the sunscreen 16 independently from the window 14. In this embodiment the sunscreen 16 is powered by a conventional motor 46 and cam assembly 48 similar to the motor and cam assembly (not shown) for a window 14. A separate button or switch 23 will actuate the motor 46 to raise or lower the sunscreen 16 by means of the cam assembly 48. The movements of the sunscreen 16 and window 14 are independent from each other, wherein each of the window 14 and sunscreen 16 has its own actuation button 22 and 23 respectively for activating its own motor and cam assembly.

Figure 6A:
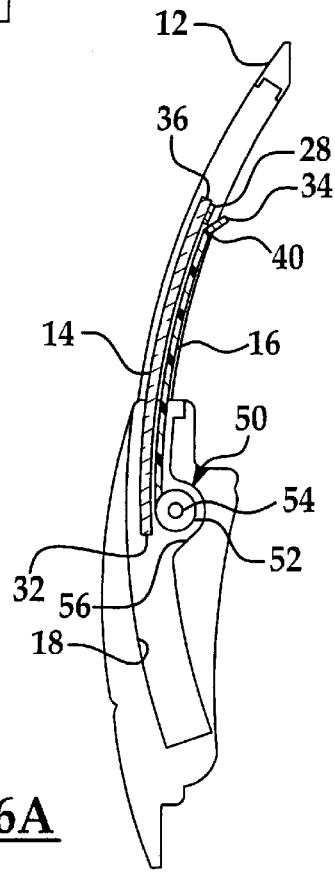
FIG. 6A is a cross sectional view of a eighth embodiment of the invention.
Figure 6B:
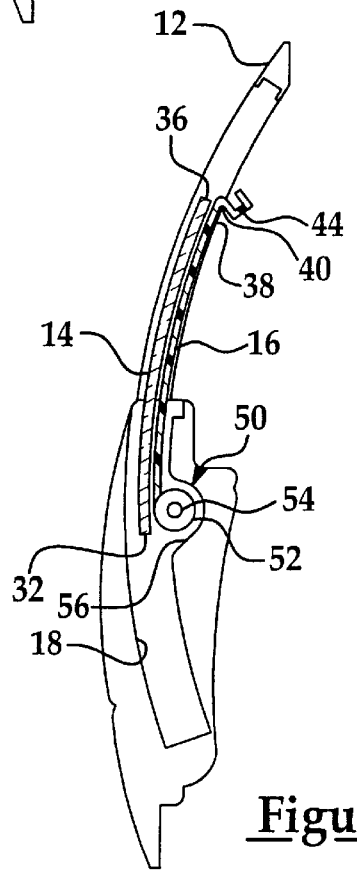
FIG. 6B is a cross sectional view of a ninth embodiment of the invention.

FIGS. 6A and 6B respectively shows the embodiments of a magnetic and metallic strip on the window and sunscreen, and the U-shaped member 44 along the upper peripheral edge of the sunscreen accompanying a retractable roller mechanism 50. The roller mechanism 50 is a conventional device which includes a roller 52 disposed between two end caps 54. The roller 52 rotates on and between the end caps 54. The roller mechanism 50 is disposed within a cavity 56 cut into the interior of the door frame 12 or side panel of the vehicle. The flexible material of the sunscreen 16 is wound about the roller 52. An upper peripheral edge 38 of the sunscreen is allowed to be exposed even when the sunscreen is in its lowered position. The exposed upper peripheral edge 38 of the sunscreen 16 from the roller 52 allows for the hinged end on the sunscreen 16 to pivot toward the window 14 when the sunscreen switch 24 is activated and when both the window 14 and the sunscreen 16 are in the fully lowered position. With the roller mechanism 50, the occupant may deactivate the sunscreen switch 24 when both the window 14 and the sunscreen 16 are in the raised position so that the sunscreen 16 will disconnect from the window 14. The roller mechanism 50 is biased to wind the flexible sunscreen material about the roller. Therefore, when the sunscreen switch 24 is deactivated, the sunscreen 16 will automatically retract around the roller 52.

The invention provides the advantages of being an assembly that is original equipment installed by the manufacturer and therefore requiring no installation by the owner of the vehicle. Further, the sunscreen 16 can be selectively raised with the window 14 automatically without the driver stopping the vehicle. When the sunscreen 16 is in the raised position, the interior of the vehicle is kept cooler and protected from sun damage. Articles stored in the vehicle are hidden from view from passers-by. -The semi-flexible sunscreen provides further protection to the interior of the vehicle in instances where the side window is shattered. The sunscreen material does not shatter and prevents the shattered window glass from falling into the interior of the vehicle. In addition, the car window and sunscreen assembly is virtually unnoticeable to the occupants and is therefore an aesthetically appealing option.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A side car window and sunscreen assembly for selectively moving the sunscreen with the movement of the window comprising:

a window located in a window track of a side door and selectively movable between open and closed positions; and a sheet material positionable within the window track adjacent to the side car window, said sheet material having one edge selectively attachable to the car window.

2. The assembly of claim 1, wherein said edge of one of the car window and sunscreen has a magnetic strip axed thereon and the oh one of the car window and sunscreen has a metallic strip attached thereon.

3. The assembly of claim 2, wherein the magnetic strip is selectively movable toward the metallic strip for connection thereof.

4. The assembly of claim 1, wherein said sheet material has a hinged portion pivotal about a binge and said window having a slot along a lower edge for receiving said hinged portion therein.

5. The assembly of claim 1, wherein said sheet material has a U-shaped hinged portion along one edge for selectively gripping one edge of the window.

6. The assembly of claim 5, wherein said sheet material has an L-shaped lower edge.

7. The assembly of claim 1 further comprising a roller, wherein said sheet material is retractable onto said roller.

8. The assembly of claim 7, wherein said roller is installed within a cavity of the side door.

9. In a vehicle having a side panel with a side window selectively movable between a raised position and a lowered position wherein the side window is positioned within a track in a cavity of the side panel in the lowered position, the improvement comprising:

a sunscreen positioned within said track adjacent said side window wherein said sunscreen is selectively movable between a raised position and a lowered position and said sunscreen positioned in the cavity of the side panel when in the lowered position.

10. A movable window and sunscreen for a vehicle comprising:

at least one window track operably associated with the vehicle for at least partially defining a window opening;

a window operably associated with the at least one window track for moving between an opened position and a closed position with respect to the window opening in response to operation of a window actuator; and a sunscreen operably positionable within the window track, adjacent to the window, the sunscreen having at least one connection attachable to the window, the sunscreen being movable between an extended position and a retracted position with respect to the window opening.

11. The movable window and sunscreen of claim 10 further comprising:

the sunscreen selectively connectible to the window for simultaneous movement with the window in response to operation of the window actuator.

12. The movable window and sunscreen of claim 10 further comprising:

the sunscreen selectively movable between the extended and related positions independently of the window movement between the opened and closed positions.

13. The movable window and screen of claim 10, wherein the at least one connection between the widow and the sunscreen further comprises a magnetic strip attached to one of the window and the sunscreen and a metallic strip attached to an opposite one of the window and sunscreen for forming a magnetic connection between the window and sunscreen.

14. The movable window and sunscreen of claim 13, wherein the at least one connection between the window and the sunscreen further comprises:

the magnetic strip being selectively movable toward the metallic strip for connection thereto in response to an input signal.

15. The movable window an sunscreen of claim 10, a portion of the sunscreen pivotable about a hinge, and the window having a complementary feature adjacent a lower edge for operably engaging the sunscreen with respect the window.

16. The movable window and sunscreen of claim 10, wherein the at least one connection between the window and the sunscreen further comprises:

U-shaped hinged portion of the sunscreen formed along at least one edge for selectively gripping at least one edge of the window.

17. The movable window and sunscreen of claim 16, wherein the at least one connection between the window and the sunscreen further comprises:

an L-shaped lower edge formed on the sunscreen for operable engagement with the window.

18. The movable window and sunscreen of claim 10 further comprising:

a storage roller for receiving the sunscreen thereon when the sunscreen is in the retracted position.

19. The movable window and sunscreen of claim 18, wherein the roller is supported within a cavity of the vehicle.

20. In a vehicle having a body panel defining a substantially enclosed cavity and at least partially defining an opening, a window positionable within the cavity and selectively movable between a closed position and an opened position with respect to the opening, the window operable with respect to at least one window track for guiding movement of the window between the closed and opened positions with respect to the opening in response to operation of a window actuator, the improvement comprising:

a sunscreen operably positioned within the window track and movable between an extended position and a retracted position with respect to the opening, and at least one connector operable between an engaged position and a disengaged position with respect to the window and the sunscreen, the at least one connector for permitting movement of the sunscreen in conjunction with movement of the window when in the engaged position and for permitting movement of the sunscreen and the window independently of one another when in the disengaged position.

21. The improvement of claim 20, wherein the at least one connector further comprises a magnetic strip attached to one of the window and the sunscreen, and a metallic strip attached to an opposite one of the window and sunscreen for forming a magnetic connector between the window and sunscreen.

22. The improvement of claim 21 further comprising:

the magnetic strip being selectively movable toward the metallic strip for connecting thereto in response to an input signal.

23. The improvement of claim 20, wherein the at least one connector further comprises a portion of the sunscreen pivotable about a hinge, and the window having a completely feature adjacent a lower edge for operably connecting the sunscreen with respect to the window for synchronized movement.

24. The improvement of claim 20, wherein the at least one connector further comprises:

a U-shaped hinged portion of the sunscreen formed along at least one edge for selectively gripping at least one edge of the window.

25. The improvement of claim 20 further comprising:

an L-shaped lower edge formed on the sunscreen for operable engagement with the window.

26. The improvement of claim 20 further comprising:

a storage roller positionable within the cavity of the body panel for receiving the sunscreen when the sunscreen is in the retracted position.

* * * * *